(No Model.) J. B. G. A. CANET. 8 Sheets—Sheet 3.
GUN CARRIAGE.
No. 557,487. Patented Mar. 31, 1896.

(No Model.)  8 Sheets—Sheet 5.

J. B. G. A. CANET.
GUN CARRIAGE.

No. 557,487.  Patented Mar. 31, 1896.

Witnesses:
G. W. Rea
Thos. A. Green

Inventor:
Jean B. G. A. Canet,
By James L. Norris
Atty.

(No Model.) 8 Sheets—Sheet 6.

J. B. G. A. CANET.
GUN CARRIAGE.

No. 557,487. Patented Mar. 31, 1896.

Witnesses:
G. W. Rea
Thos. A. Green

Inventor:
Jean B. G. A. Canet,
By James L. Norris.
Atty.

(No Model.) 8 Sheets—Sheet 7.
J. B. G. A. CANET.
GUN CARRIAGE.

No. 557,487. Patented Mar. 31, 1896.

Witnesses

Inventor
Jean B. G. A. Canet.
By James L. Norris
Attorney (No Model.) 8 Sheets—Sheet 8.

J. B. G. A. CANET.
GUN CARRIAGE.

No. 557,487. Patented Mar. 31, 1896.

Witnesses

Inventor
J. B. G. A. Canet
By James L. Norris
Attorney

UNITED STATES PATENT OFFICE.

JEAN BAPTISTE GUSTAVE ADOLPHE CANET, OF PARIS, FRANCE.

GUN-CARRIAGE.

SPECIFICATION forming part of Letters Patent No. 557,487, dated March 31, 1896.

Application filed April 11, 1894. Serial No. 507,116. (No model.) Patented in France February 6, 1894, No. 222,209.

*To all whom it may concern:*

Be it known that I, JEAN BAPTISTE GUSTAVE ADOLPHE CANET, engineer, a citizen of the Republic of France, and a resident of Paris, in the Republic of France, have invented certain new and useful Improvements in Field, Siege, and Similar Gun Mountings, (for which I have obtained a patent in France, Provisional No. 222,209, dated February 6, 1894, and certificate of addition thereto, dated February 20, 1894,) of which the following is a specification, reference being had to the accompanying drawings.

This invention relates to field, siege, and similar gun mountings, and has for its object to provide for diminishing the recoil of such mountings.

The most important feature of my said invention relates to the construction of the mounting in two principal parts—viz., the body of the mounting and the trail—which parts can slide axially the one within the other in the same manner as the tubes of a telescope. One of the said parts is adapted to be fixed or anchored to the ground, and the other of the said parts recoils with the gun. In some cases I provide for more than two parts sliding relatively to each other. In combination with the aforesaid telescopic parts I provide a brake for diminishing the recoil and recuperator apparatus for storing up energy during recoil to be used for restoring the gun to battery after recoil.

In the accompanying drawings I have shown a hydraulic brake; but I wish it to be clearly understood that I may use an electric or friction or other suitable kind of brake. In the different arrangements illustrated the trail is anchored or rendered immovable by means of a spade fixed thereto, which spade is driven into the ground by the recoil at the first discharge, or which can be previously driven into the ground by the gunners.

I am aware that the employment of a spade at the rear end of the trail for fixing the latter to the ground is already known, and consequently I do not claim the exclusive right to the same.

In some instances in lieu of rendering the trail immovable I allow it to recoil freely with the gun, and I fix the body of the mounting to the ground by means of a spade of suitable form.

Another important feature of my invention relates to the employment, in combination with the telescopic mounting, of a friction-brake for assisting to check the recoil, which brake operates during the recoil preferably with an intensity which can be proportioned to the energy of recoil and which automatically ceases to act or becomes very weak during the return to battery.

In the accompanying drawings.

Like letters of reference denote corresponding parts throughout the drawings.

A is the trail.

B is the spade secured to the lower end of the trail and adapted to enter the ground to prevent the recoil of the trail after firing.

Figures 2, 3:
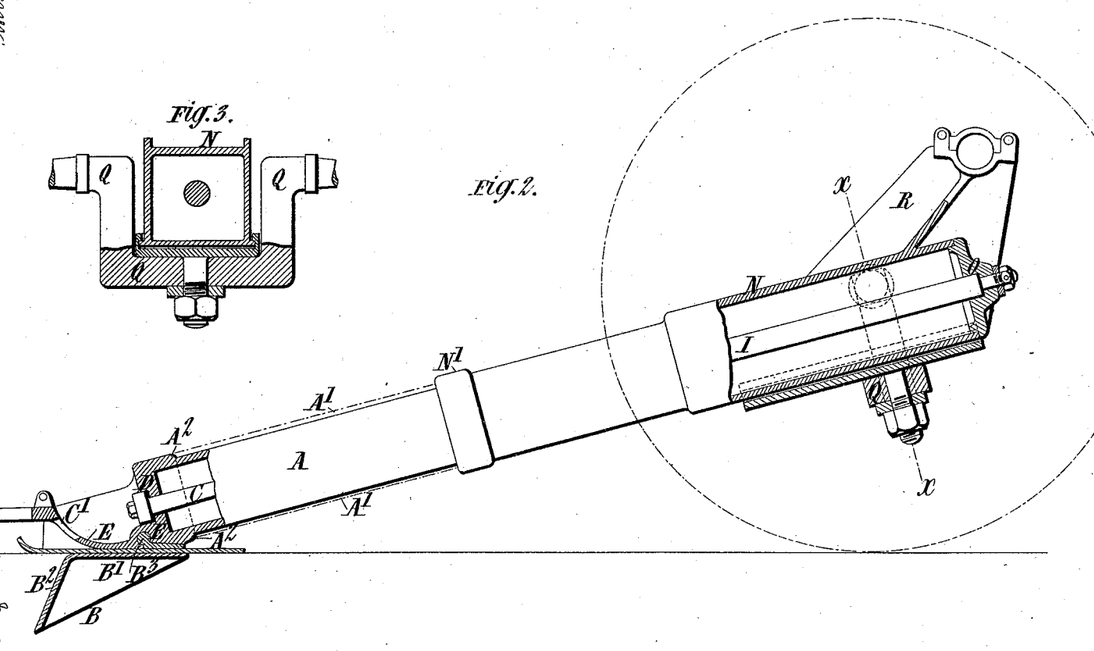
Fig. 2 is an elevation, partly in section, showing slight modifications in the details of the mounting.
Fig. 3 is a section on the line $x\,x$ of Fig. 2.

N is the body of the mounting, which can slide telescopically on the trail A. The said body N is carried by the axle Q, which is cranked for this purpose, as shown in Fig. 3. Formed with or secured to the body N are side cheeks R, in the upper ends of which are formed the bearings for the trunnion of the gun L.

Figure 1:
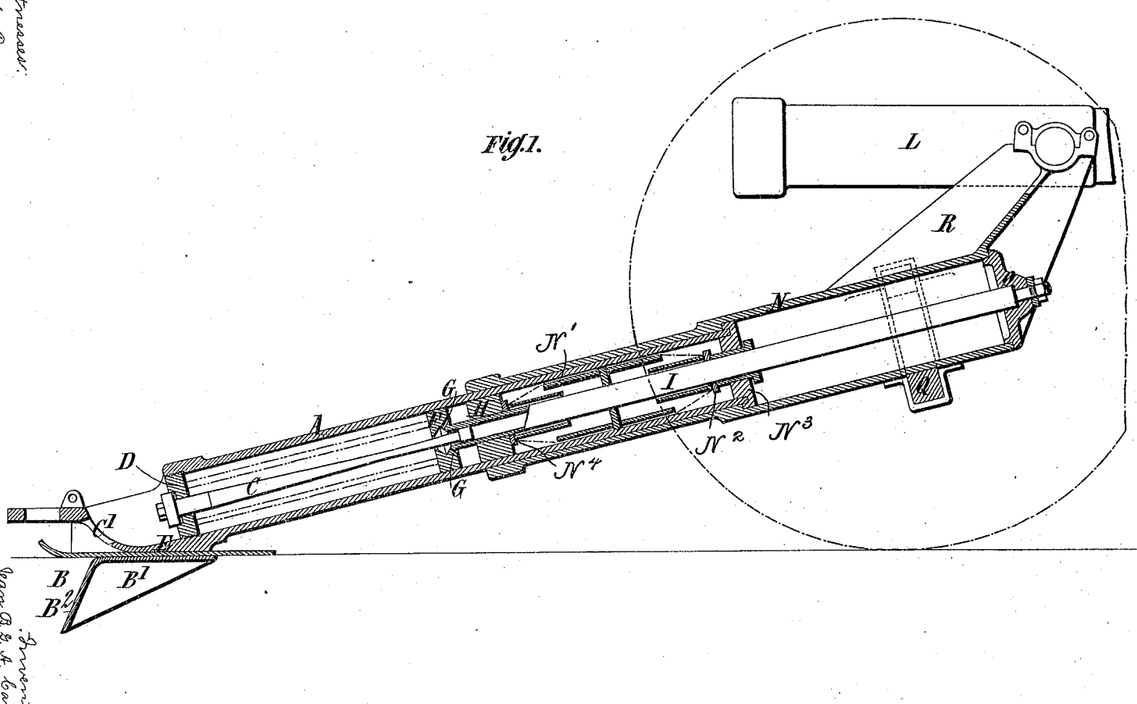
Figure 1 is a sectional elevation of a mounting constructed in accordance with my invention.

The trail A, carrying at its extremity the spade, incloses, in the forms or modifications shown in Figs. 1 and 2, the hydraulic recoil-brake, which is of the well-known central-rod type previously patented by me. The central rod C is fixed at D by a screw, as shown, or by other suitable means. For effecting rapid dismounting this rod C can be drawn back through an aperture C' provided for this purpose in the bearing-plate E. The liquid passes from one side of the piston to the other by a series of orifices G G, the total sectional area of which available for the flow varies according to the shape or diameter of the rod C.

H is a movable water-tight partition, piston, or head traversed by the piston-rod I and furnished with the necessary water-tight packing. Between the forward face of the piston or head H and the forward fixed end of the trail A is placed the elastic-recuperator apparatus, which may be of any well-known or suitable type. For example, I have shown in Fig. 1 an elastic recuperator composed of a series of plate-springs N' bearing at one end against a collar N² carried by a fixed abutment N³, and the other end bearing against a collar N⁴ movable with the head H, as will be evident, and in Fig. 4 the elastic recuperator consists of a body of compressed air or other compressible fluid situate in the trail A.

The piston-rod I of the brake is attached at O to the forward end of the body of the mounting N.

The spade B which I use is preferably of the form shown in Figs. 1 and 2. The means for securing it to the bearing-plate E are preferably such as will allow it to be quickly removed and replaced. For this purpose the spade has on its upper face a tenon B³, Fig. 2, which corresponds with a groove of the same form provided in the bearing-plate E. The spade proper, B, comprises two vertical sides B' and a rear inclined face B².

Figures 5, 6:
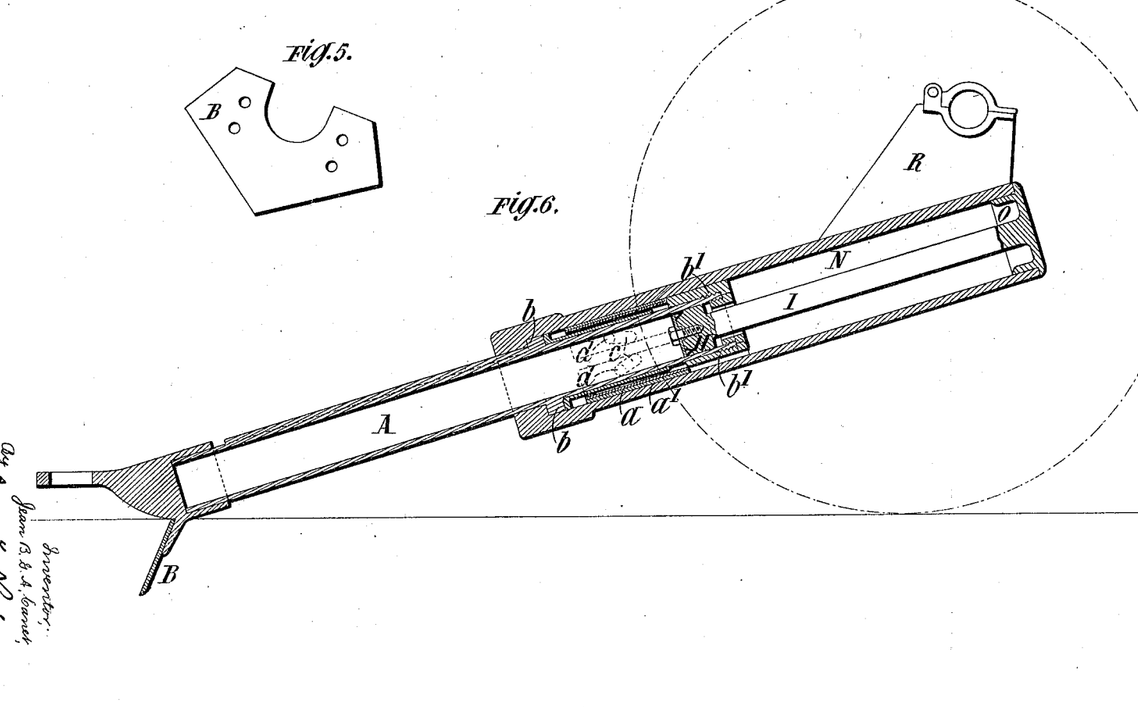
Fig. 5 is a face view of a modified form of spade hereinafter described.
Figs. 6 to 15 show various forms of friction-brake for assisting to check the recoil, as hereinafter described.

I sometimes use a spade consisting of a simple sheet-metal plate, shaped as shown in Fig. 5, for example, and having its lateral edges beveled.

The central-rod type of brake above referred to is that which I prefer to employ; but there are cases where I find it desirable to replace this by other well-known forms of brake.

Figure 16:
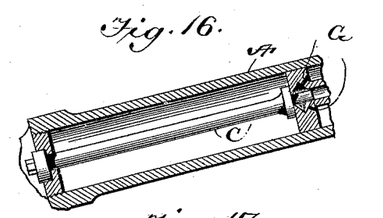
Fig. 16 is a detail showing one manner of rigidly fixing the trail to the body of the mounting should the brake or recuperator become inoperative.
Figure 17:
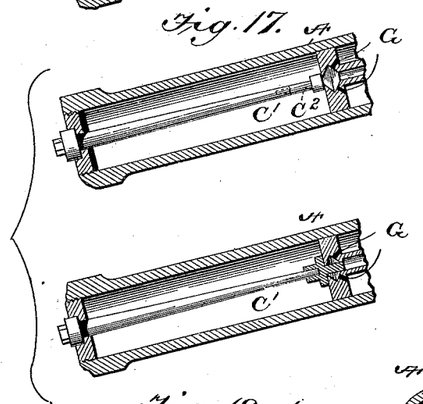
Fig. 17 shows in detail other means of accomplishing the same end.
Figure 18:
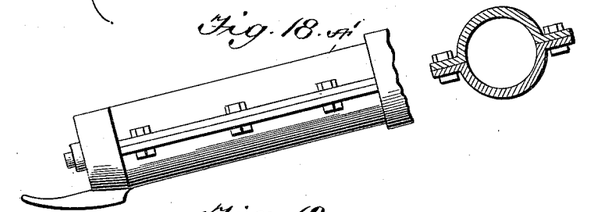
Fig. 18 represents in side elevation and section a further means of accomplishing this end.

The operation of my improved mounting is as follows—that is to say, at the moment of putting the gun in battery the spade B simply rests with its edge on the ground; but at the first discharge it is driven into the ground more or less deeply, according to the nature or condition of the ground, and is thus fixed for the next and following discharges. I thus provide for diminishing the recoil and storing up energy necessary for the return of the gun to battery. During the recoil the body of the mounting N slides on the cylinder of the trail A, carrying with it the wheels and the brake-piston, which latter compresses the liquid and forces it through the aforesaid orifices G. The displacement of a portion of the liquid in the brake-cylinder by the piston-rod I causes the head H to be moved in the trail A in the opposite direction to that of the recoil, thereby compressing the recuperator, which, as soon as the recoil ceases, gives back the stored-up energy and returns the gun to battery. Should the brake or the recuperator from any cause become inoperative, I rigidly fix the trail to the body of the mounting, and the firing may then be continued, the mounting then acting as an ordinary field or siege carriage with a spade and rigid trail. To facilitate this change I may replace the center rod C, which, as above stated, is easily dismounted, by another rod, such as C', (illustrated in Fig. 16,) having a diameter and length necessary for it to abut against the brake-piston in the firing position; or I provide the end of the rod C with a cap, such as C², Fig. 17, screwed into the end of the rod or a cap C³ screwed onto said rod, as also illustrated in Fig. 17, of suitable shape and dimensions to engage the piston F and prevent the recoil. I may accomplish the same end by placing sleeve A, as shown in Fig. 18 and in dotted lines, Fig. 2, around the trail-cylinder between a shoulder A² of the latter and the rear end N' of the body of the mounting, or by inserting, when the dimensions of the trail-cylinder permit it, a circular divided ring in a corresponding groove in the side of the trail-cylinder to bear against the rear face of the body of the mounting when in the firing position.

In a modification of my invention, as most clearly shown in Figs. 20, 21, 22, and 23, I secure the wheels to the fixed trail instead of to the recoiling part N. The body of the mounting is furnished with suitable shoes 1 and is arranged to slide in a cradle 2, which is itself securely fixed to the crank-axle, as at 3, and attached to the fixed trail by two lateral girders 4. In this mounting, therefore, the trail, the cradle, and the wheels form the non-recoiling part, while the body of the mounting, the cheeks, and the gun form the recoiling part. Any suitable type of brake may be used.

Figures 20, 21, 22, 23:
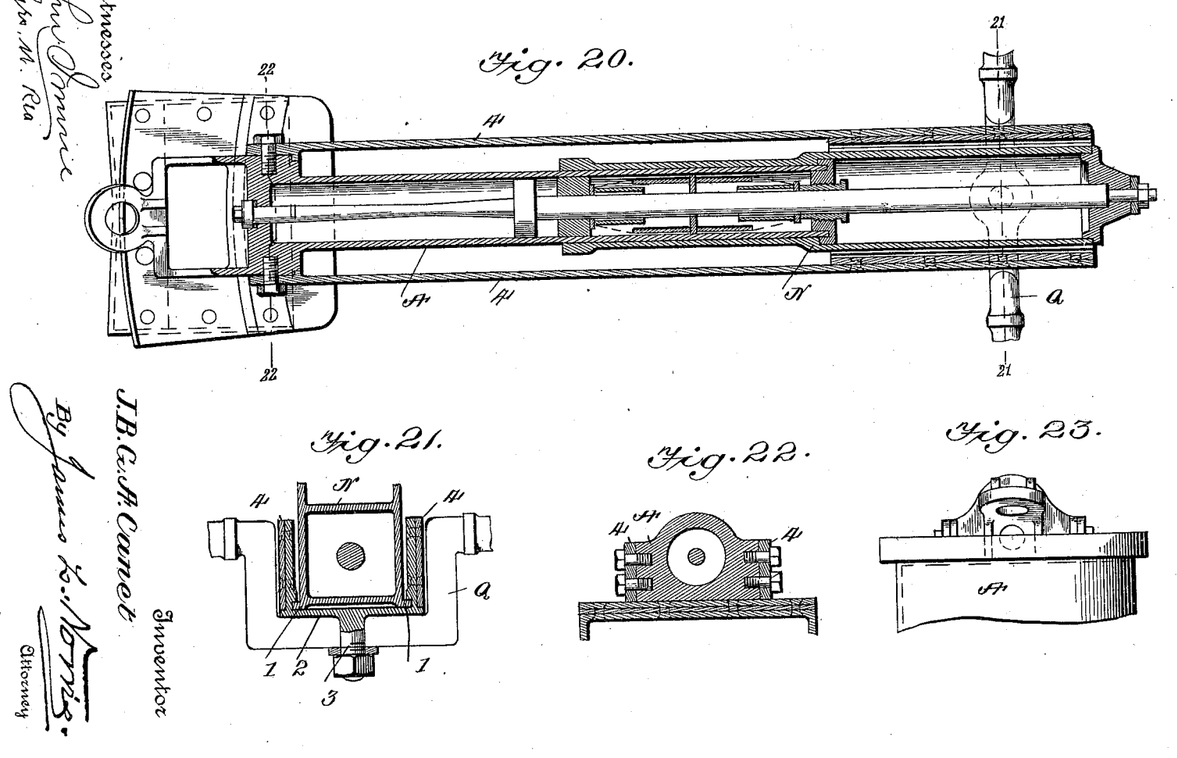
Fig. 20 is a sectional elevation of a modified form of mounting.
Figs. 21 and 22, cross-sectional views taken, respectively, on the lines 21 and 22 of Fig. 20.
Fig. 23 is a detail view of the rear end of the trail A.

The operation of this mounting is otherwise substantially the same as that hereinbefore described, and in case the brake becomes inoperative I render the body of the mounting immovable with regard to the trail by means of one of the devices hereinabove described.

Figure 4:
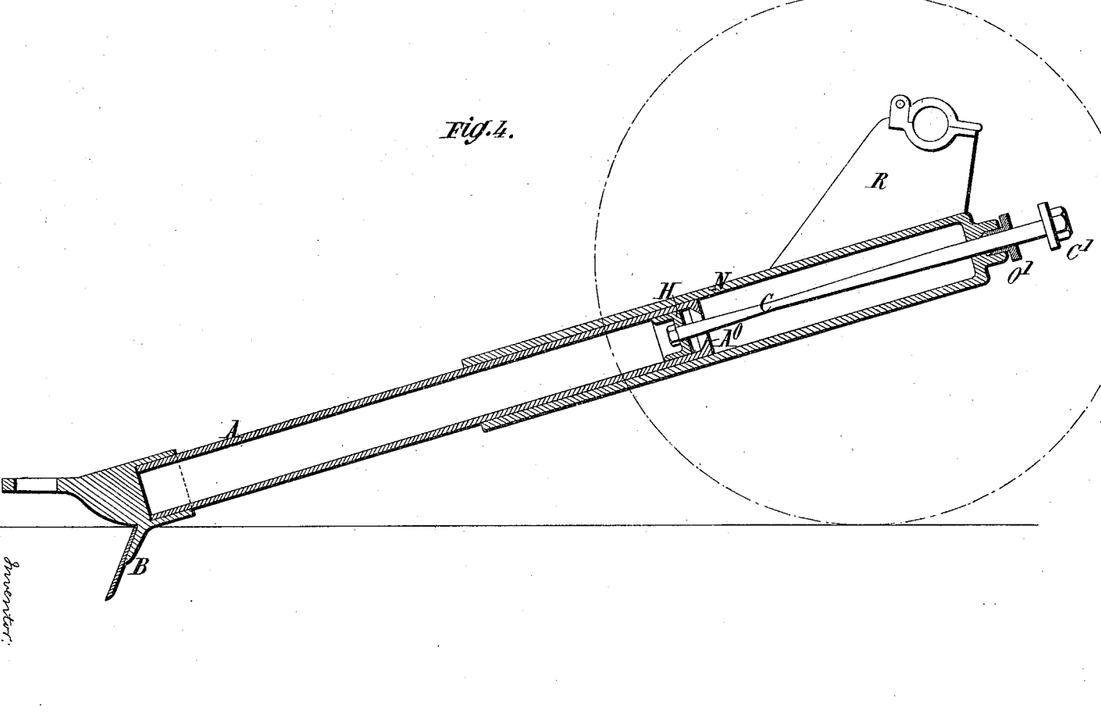
Fig. 4 is a sectional elevation of a modified form of my improved mounting.

A further modification, differing from the above in the interior arrangement of the brake and the recuperator, is shown in Fig. 4, and it can be employed either in the case where the wheels participate in the recoil or in that where they do not recoil. The brake is constituted by the body of the mounting N, which contains the liquid, the recuperator being placed in the trail A. The rod C carries at its rear end the water-tight piston H'. The forward end of said rod C passes through a stuffing-box O' in the end of the body N and is furnished with a head C'' to prevent withdrawal. The forward end A⁰ of the trail serves, in conjunction with the rod C, to provide the required variable resistance to the recoil in the various stages thereof. The spade B is of the form shown in Fig. 5. The operation of this mounting is the same as that above described. The recuperator may, according to circumstances, be constituted by metal springs or the like or by compressed air.

The various forms of friction-brake which I may employ for assisting to check the recoil (illustrated in Figs. 6 to 15) will now be described.

Figure 19:
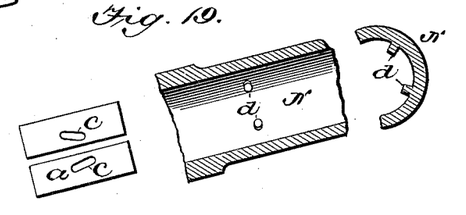
Fig. 19 illustrates in enlarged detail the brake mechanism illustrated in Fig. 6.

The brake shown in Fig. 6 is composed, essentially, of a tubular sleeve $a$, covered with wood $a'$, copper, leather, or other analogous material. In certain cases the cylinder is not covered; but in such case its rubbing-surface is prepared so as to cause great friction. This plate is split longitudinally and is placed around the trail A and within the cylinder N. The said sleeve has a certain amount of longitudinal play, which is limited by two collars $b\ b'$, fixed on the trail. The said sleeve is furnished with two grooves or inclines $c\ c$, in or between which project two radial studs $d\ d$, fixed on the trail A, as shown in said figure and in enlarged detail in Fig. 19. During the first part of the recoil the sleeve $a$ adheres sufficiently to the body of the mounting N to be carried back by said body until it has traversed the whole or a part of the longitudinal play allowed it by the aforesaid collars $b\ b'$, and the grooves $c\ c$ are thereby caused to travel over the studs $d\ d$. By this means the sleeve $a$ is expanded and pressed very tightly against the body of the mounting N. The distance through which the sleeve $a$ is moved and the intensity of the friction produced by its expansion depend on the shape of the inclines or grooves $c\ c$. The friction can be proportioned at each instant to the energy due to the recoil. As the gun returns into battery the sleeve $a$ moves with the mounting N, and its inclines or grooves $c\ c$ glide over the studs $d\ d$, by which means the pressure of the sleeve against the part N is relieved, and the said sleeve contracts again on the cylinder of the trail. It is seen that the operation of this brake is automatic.

Figure 7:
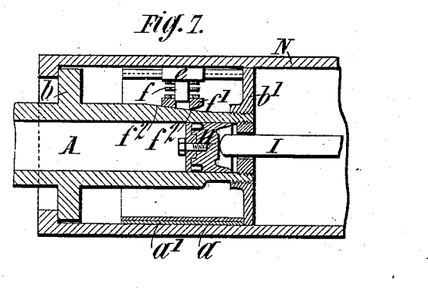
Figure 8:
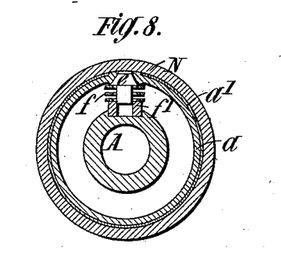

In the arrangement illustrated in Figs. 7 and 8 the mounting is similar to the preceding; but for expanding the sleeve I provide a wedge $e$, which is pressed between the edges of the sleeve—that is to say, in the slit or division—by a spring $f$, which bears against a piece $f'$ that rests on an inclined part $f^2 f^2$ of the fixed trail A. The operation of this device is as follows: At the beginning of the recoil the divided ring $a$ is carried backward by the part N, with which it is in frictional contact, and the spring $f$ is thus caused to mount on the incline $f^2 f^2$, thereby forcing the wedge $e$ farther into the division of the sleeve and expanding said sleeve, thus tightening it against the part N. As soon as the return into battery commences the ring $a$ moves forward with the body of the mounting until arrested by meeting the flange or collar $b'$, by which movement the spring $f$ is again slackened and the friction reduced, whereupon the mounting returns easily to the firing position. The wedge $e$ can be replaced by other devices which will give the same result.

It is obvious that the sleeve $a$ may be made in two or more parts, each provided with a spring sliding over a corresponding incline on the trail A.

Figure 9:
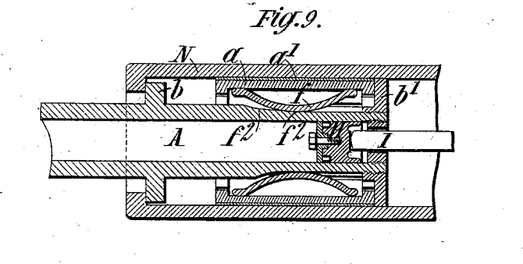
Figure 10:
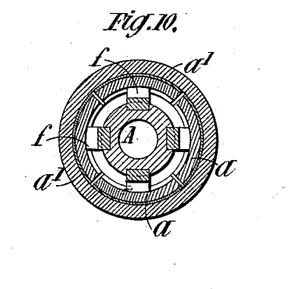

Fig. 9 illustrates a modification of the arrangements above described. The brake is composed of a ring divided into any suitable number of parts (four in the drawings) mounted on the trail-cylinder A between the fixed collars $b\ b'$. In the firing position said parts adhere slightly to the body of the mounting N, being pressed thereagainst by springs $f$, which I have here represented as plate-springs, but which may be of any other suitable description. The forward part of the trail is shaped to the form of a truncated cone in such a manner that during the recoil the springs mount said coned part and operate to press the divided parts of the ring against the body of the mounting N with progressively-increasing pressure. The operation is the same as that of the brake last described; but the springs instead of acting on the edges of the divided ring press on the center portions of the parts thereof. It is clear that in this case, as in the preceding, each of the portions of the ring forming the brake can be joined to the one next to it by any suitable means which allows of the required expansion of the ring.

Figure 11:
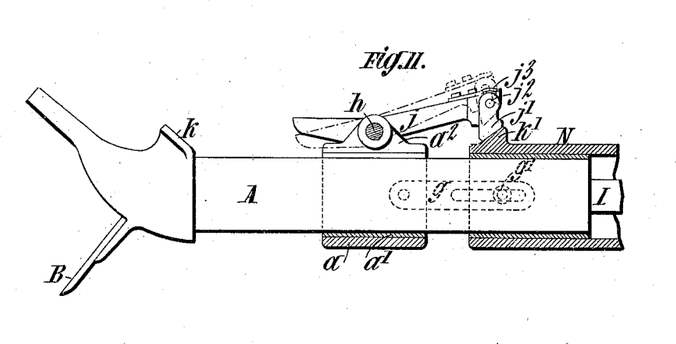
Figure 12:
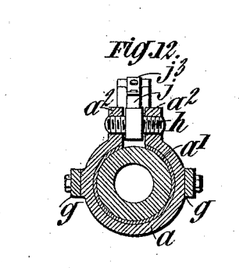

As hereinbefore mentioned, the brake can in certain cases be arranged to operate on the exterior of one of the sliding parts of the mounting. Such a construction is shown in Figs. 11 and 12. The split ring or clip $a$ constituting the brake is connected to the body of the mounting N by two side-slotted links $g\ g$ secured to the said ring $a$. Fixed to the body of the mounting N on each side thereof is a radial pin $g'$ projecting through the slots in the said links $g$. The clip bears on the fixed trail either directly or through the intervention of a lining $a'$ of some material which gives great friction. Its free edges are terminated by two arms $a^2\ a^2$, which are connected by a screw-bolt $h$, one end of which has right-handed threads and the other left-handed threads. According to the direction in which this bolt is turned the clip $a$ will be opened or closed, and consequently will be slackened or tightened on the fixed trail A. The tightening of the clip during the recoil and the slackening thereof during the return into battery are effected as follows—that is to say, secured to the bolt-screw $h$ is a double lever or arm $j$ adapted to be controlled by two inclines or projecting parts $k\ k'$ provided, respectively, on the fixed trail and on the movable part N of the mounting. By this means the lever $j$ is tilted during the recoil and return into battery in one direction or the other, according to the position of the ring or clip $a$ on the trail, and consequently produces the tightening or slackening of the said ring. The operation is as follows: After the discharge the body of the mounting N first recoils independently of the ring $a$ until it comes in contact with said ring. The ring then recoils with the body of the mounting N. During the first part of the recoil, before the ring $a$ commences to move, the incline $k'$ operates to turn the lever $j$ and tighten the clip on the trail. At the end of the recoil the tail of the lever $j$ strikes the incline $k$, and the said lever is tilted back, the clip $a$ being thereby slackened. The body of the mounting N is then returned into battery by the recuperator. It is necessary that the incline $k'$ shall be able to pass the lever $j$ on the return without raising said lever. For this purpose the said lever $j$ is furnished with a pivoted arm $j'$, which can turn in the direction of the trail around an axis $j^2$. The said arm $j'$ is so turned by the projection $k'$ without raising the lever $j$, and when the incline has cleared the lever the arm $j'$ returns to its primitive position under the action of the spring $j^3$. As soon as the pins $g'$ have arrived at the ends of the slots in the links $g$ the ring $a$ is again drawn along by the body of the mounting N, and the different parts are thus returned to their firing position. It is clear I can employ other equivalent means for insuring that the ring $a$ shall automatically tighten and slacken in the manner and for the purpose above specified.

Figure 13:
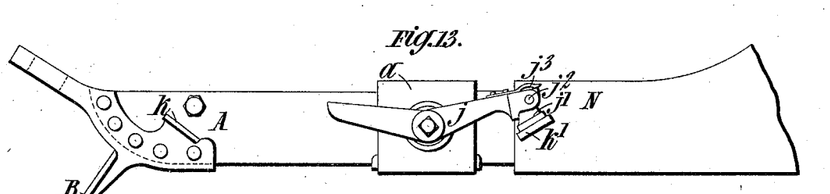
Figure 14:
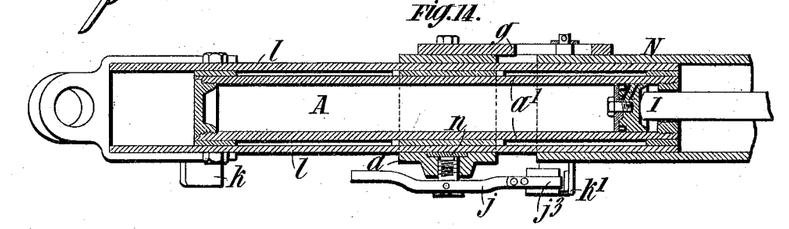
Figure 15:
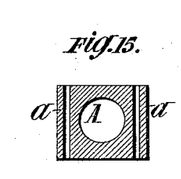

Figs. 13, 14, and 15 represent a modification of the preceding arrangement. In this construction the friction takes place between plane surfaces. The ring is, as before, connected to the body of the mounting by means of one or several links $g$, and tightening is produced by the alternating movements of a lever $j$, one of the extremities of which carries an arm oscillating in the direction of the trail, and which is returned to its initial position by a spring. To increase the friction-surface, I provide one or more flexible plates $l\,l$ connected to the trail at their ends. Between these plates $l\,l$ are placed bronze or other metal plates $e'$ covered with a material which produces great friction. These different sheets are in one piece with the part $a$, through which the tightening-screw is passed. A small bronze plate $n$ is interposed between the screw and the plate $l$. The operation is the same as that of the mechanism shown in Figs. 11 and 12.

All the arrangements which I have just enumerated can evidently be modified according to the relative positions of the mounting and the trail. Although I have shown in the drawings the body of the mounting external to the trail, it can also be internal; also, the friction can take place either on the interior or the exterior of either one of these two pieces. The recuperator can similarly be of the metallic, liquid or fluid type or a combination of any two or more of such types.

I may further modify the construction of the mounting so that the common axis instead of being straight, as shown in the accompanying drawings, is curved.

What I claim is—

1. A wheeled gun carriage or mounting having a trail consisting of a plurality of telescopically-arranged parts, one of said parts sliding relatively to the other during the recoil and return to battery, substantially as described.

2. The combination with a gun carriage or mounting, having a trail consisting of a plurality of telescopically-arranged parts, of a brake operatively arranged in connection therewith to resist the recoil of the gun, substantially as described.

3. The combination with a gun carriage or mounting, having a trail consisting of a plurality of telescopically-arranged parts, of a recuperator arranged in operative connection therewith to return the gun to battery after recoil, substantially as described.

4. In a wheeled gun carriage or mounting the combination with the body of the mounting arranged to move with the gun, of a trail fixed to the ground and arranged telescopically with relation to the body of the mounting, a hydraulic brake and a recuperator arranged within said trail and body of the mounting, and a water-tight partition separating said brake and recuperator.

5. In a wheeled gun carriage or mounting having a trail the combination with a plurality of telescopically-arranged parts, one of said parts sliding relatively to the other during the recoil and return to battery, of a brake to resist the recoil and a recuperator to return the gun to battery, substantially as described.

6. In a wheeled gun carriage or mounting, the combination of a trail adapted to be fixed to the ground, of a cradle attached to said trail and to the wheel-axle, and the body of the mounting seated in said cradle and adapted to slide therein when the gun recoils, substantially as described.

7. The combination in a gun-mounting having a trail, of a plurality of telescopically-arranged parts and a spade removably secured to one of said parts, substantially as described.

In testimony whereof I have hereunto set my hand this 16th day of March, 1894.

JEAN BAPTISTE GUSTAVE ADOLPHE CANET.

Witnesses:
   CLYDE SHROPSHIRE,
   G. BIGUES.